United States Patent
Song et al.

(10) Patent No.: US 9,799,373 B2
(45) Date of Patent: Oct. 24, 2017

(54) COMPUTERIZED SYSTEM AND METHOD FOR AUTOMATICALLY EXTRACTING GIFS FROM VIDEOS

(71) Applicant: YAHOO HOLDINGS, INC., Sunnyvale, CA (US)

(72) Inventors: Yale Song, New York, NY (US); Alejandro Jaimes, Barcelona (ES)

(73) Assignee: YAHOO HOLDINGS, INC., Sunnyvale, CA (US)

(*) Notice: Subject to any disclaimer, the term of this patent is extended or adjusted under 35 U.S.C. 154(b) by 130 days.

(21) Appl. No.: 14/933,397

(22) Filed: Nov. 5, 2015

(65) Prior Publication Data
US 2017/0133054 A1 May 11, 2017

(51) Int. Cl.
*G11B 27/00* (2006.01)
*G11B 27/031* (2006.01)

(52) U.S. Cl.
CPC ................. *G11B 27/031* (2013.01)

(58) Field of Classification Search
CPC ....... G11B 27/031; H04L 51/00; H04L 67/02; H04L 51/10; H04L 51/066
USPC ........................................................ 386/279
See application file for complete search history.

(56) References Cited

U.S. PATENT DOCUMENTS

| | | | |
|---|---|---|---|
| 2011/0037767 A1* | 2/2011 | Casanova | H04L 51/00 345/473 |
| 2014/0233915 A1* | 8/2014 | Middleton | G11B 27/031 386/282 |
| 2014/0359483 A1* | 12/2014 | Forutanpour | H04L 67/10 715/753 |

* cited by examiner

Primary Examiner — Thai Tran
Assistant Examiner — Jose Mesa
(74) Attorney, Agent, or Firm — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically extracting and creating an animated Graphics Interchange Format (GIF) file from a media file. The disclosed systems and methods identify a number of GIF candidates from a video file, and based on analysis of each candidate's attributes, features and/or qualities, as well as determinations related to an optimal playback setting for the content of each GIF candidate, at least one GIF candidate is automatically provided to a user for rendering.

20 Claims, 7 Drawing Sheets

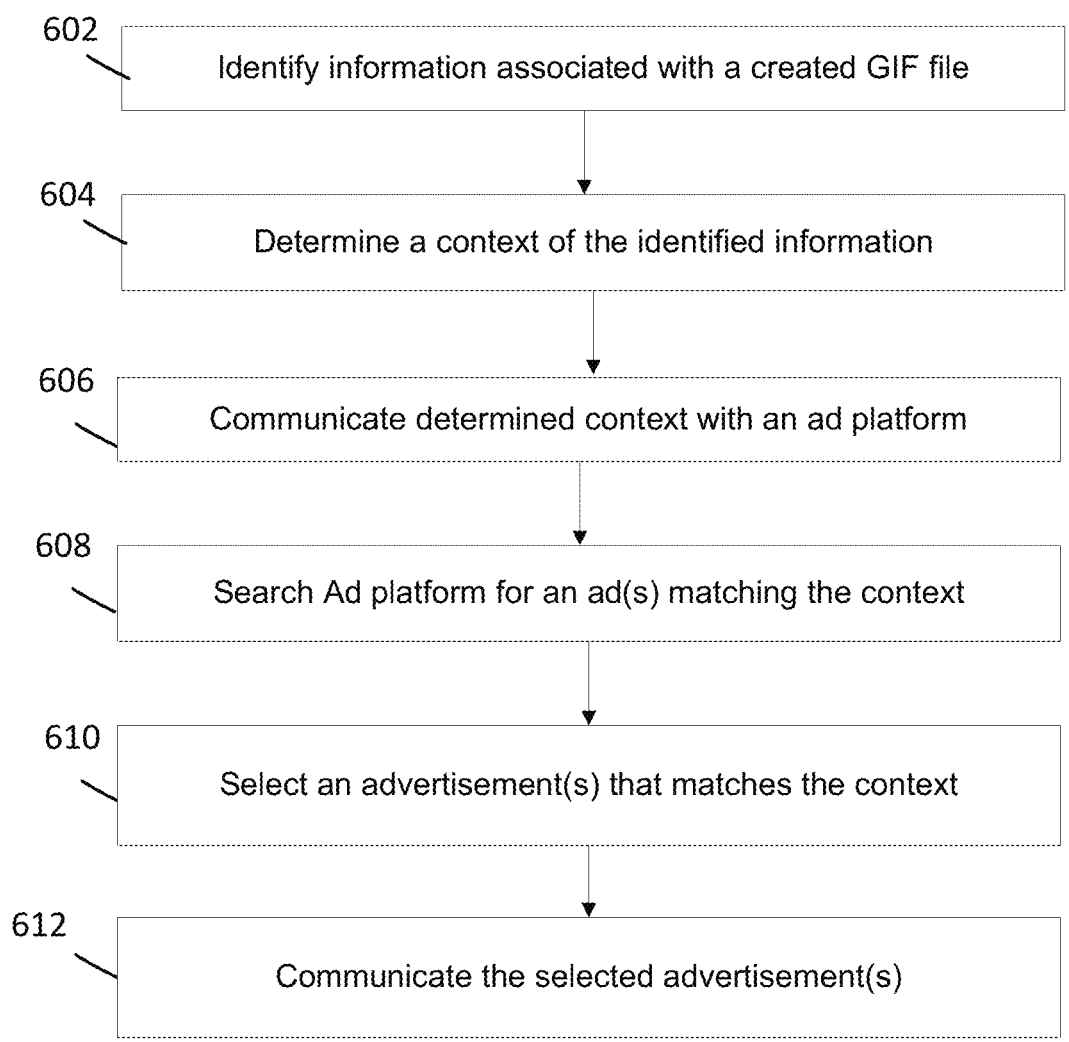

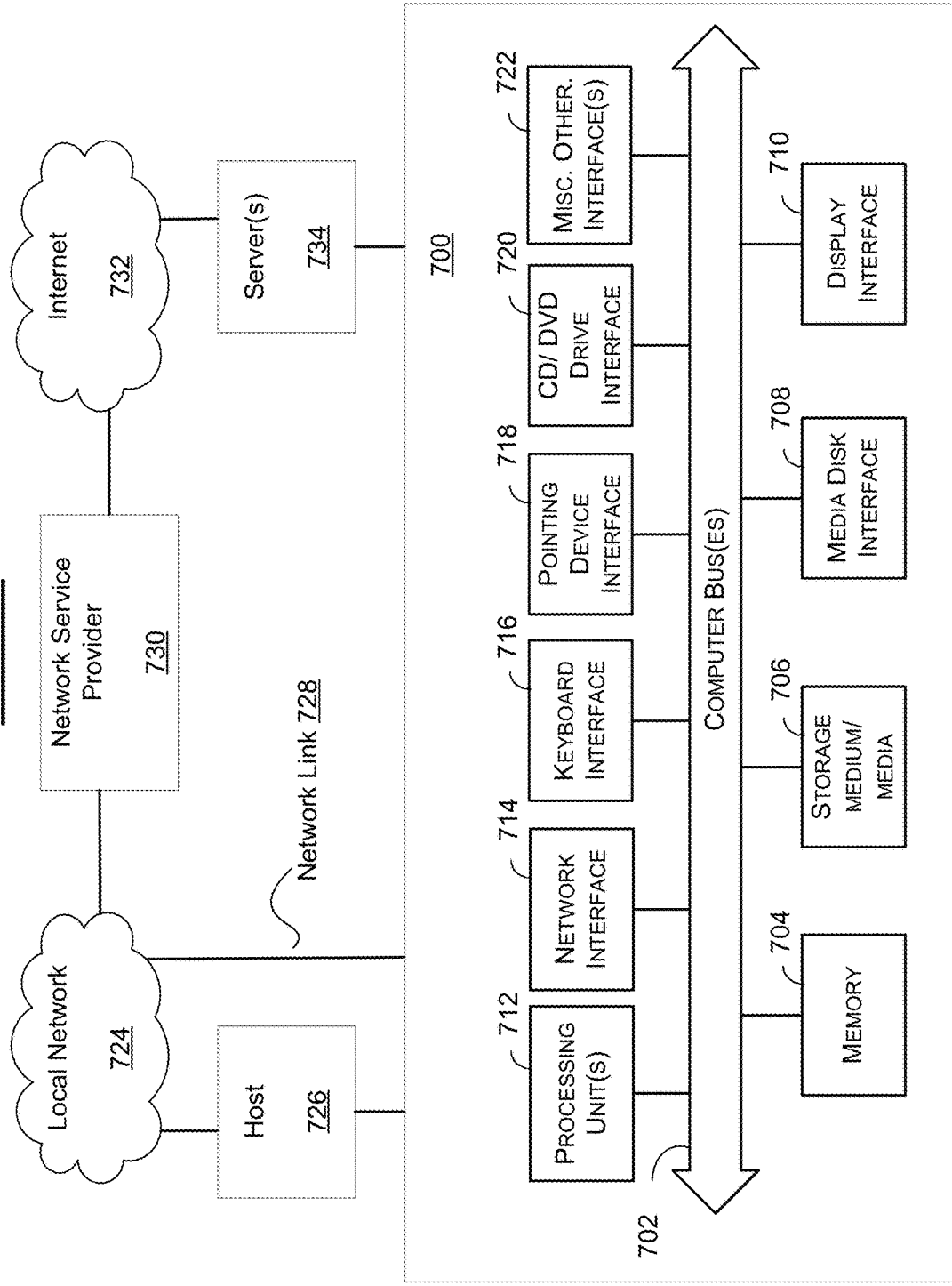

COMPUTERIZED SYSTEM AND METHOD FOR AUTOMATICALLY EXTRACTING GIFS FROM VIDEOS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content generating, searching, providing and/or hosting computer systems and/or platforms by modifying the capabilities and providing non-native functionality to such systems and/or platforms for automatically extracting and creating an animated GIF from a video file.

SUMMARY

The present disclosure provides novel systems and methods for automatic extraction and creation of animated Graphics Interchange Format (GIF) files from a video file. GIFs are efficient at displaying moving images in lieu of actual video files. They are compressed and low bandwidth and require no complex video editing tools.

Presently, GIFs are used in a wide variety of network applications, such as social network sites, blogs, news, and other content distribution services. While becoming more prevalent, the creation of GIFs remains a manual and labor intensive process. The automatic GIF creation described herein enables rapid and automatic GIF development from video content with a high likelihood that the automatically created GIF will attain high visibility when shared in a network. This presents improvements to the quality of, and distribution of, user generated content.

According to some embodiments, the disclosed systems and methods first identifies a number of "GIF candidates" (also referred to as "shots", and understood as segments or portions) of a video file by determining shot boundaries within the video. Such shot boundaries, which delineate the segments of the video file, are associated with transition frames within the video file. For example, such transition frames can include, but are not limited to, a cut between video frames, fade in/out between frames, dissolve or wipe effect(s), and/or any other type of known or to be known effect that transitions between scenes of content within a video file.

The disclosed systems and methods then evaluate each GIF candidate in terms of "GIF quality" metrics thereby resulting in a score for each GIF candidate. "GIF quality" metrics can be associated with a determination of the GIF candidate's attributes and/or features, which include, but are not limited to, visual aesthetics, popularity, virality, memorability, sentiment, temporal nature of the content of the GIF, motion occurring within the segment as it is played, induced emotion as the segment is played, interestingness of the content of the segment, and the like. For example, the higher quality the score, the higher the probability the animated GIF candidate is trending, or will become trending, for example, on social media. While evaluating a GIF candidate, the disclosed systems and methods also determine an optimal playback speed for each GIF candidate—i.e., frame sampling rate and the time interval between each frame.

Thus, based on the determinations of the GIF candidates' "GIF quality" and optimal playback speed, the disclosed systems and methods can automatically create a GIF(s) from a video file that can be rendered at its optimal playback speed. In some embodiments, a selection may also occur whereby the GIF candidate having the highest "GIF quality" can be selected for presentation to a user. In some embodiments, only those GIF candidates having a "GIF quality" satisfying a threshold can be presented to a user, whereby these candidates can then be selected by a user for rendering, posting and/or sharing.

It will be recognized from the disclosure herein that embodiments of the instant disclosure provide improvements to a number of technology areas, for example those related to systems and processes that handle or process content generation and delivery to users over the internet, such as but not limited to, search engines, local and/or web-based applications, TV widgets, set-top boxes, or other types of media rendering or recommendation platforms, electronic social networking platforms and the like. The disclosed systems and methods can effectuate increased speed and efficiency in the ways that users can access and create new media content, thereby minimizing user effort, as the disclosed systems and methods, inter alia, reduce the amount of required input for a user that is searching for and/or creating media. Users are provided with a fully automated experience through the disclosed systems' and methods' creation and delivery of GIF files generated from media files. For example, the disclosed GIF creation and delivery avoids users having to manually identify specific portions of video files, as the disclosed systems and methods can automatically identify the "trending" (or popular) portions of videos and automatically generate GIF files for such portions at optimal playback speeds, thus improving opportunities for wide distribution and recognition for the GIF associated with the user.

In accordance with one or more embodiments, a method is disclosed which includes receiving, at a computing device, a request from a user for creation of an animated Graphics Interchange Format (GIF) file from a video file; determining, via the computing device, a segment within the video file, the segment determination comprising parsing the video file to identify transition frames within the video file, the segment comprising video frames of the video file existing between a pair of identified transition frames; determining, via the computing device, playback settings for the segment, each playback setting comprising a different frame sampling rate and time interval between each frame of the segment; determining, via the computing device, an n-dimensional feature vector for the segment, the feature vector determination comprising parsing the segment to identify information associated with motion, emotion and interestingness features of the segment, the feature vector based on the motion, emotion and interestingness information; determining, via the computing device, a popularity score for each playback setting based on the feature vector, the popularity score determination comprising determining an optimal playback setting for the segment from the playback settings; and automatically creating, via the computing device, the animated GIF file, the animated GIF file comprising the segment renderable at the optimal playback setting.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically extracting and creating animated GIFs from a video file.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 6 is a flowchart illustrating steps performed in accordance with some embodiments of the present disclosure; and FIG. 7 is a block diagram illustrating the architecture of an exemplary hardware device in accordance with one or more embodiments of the present disclosure.

DESCRIPTION OF EMBODIMENTS

Figure 1:
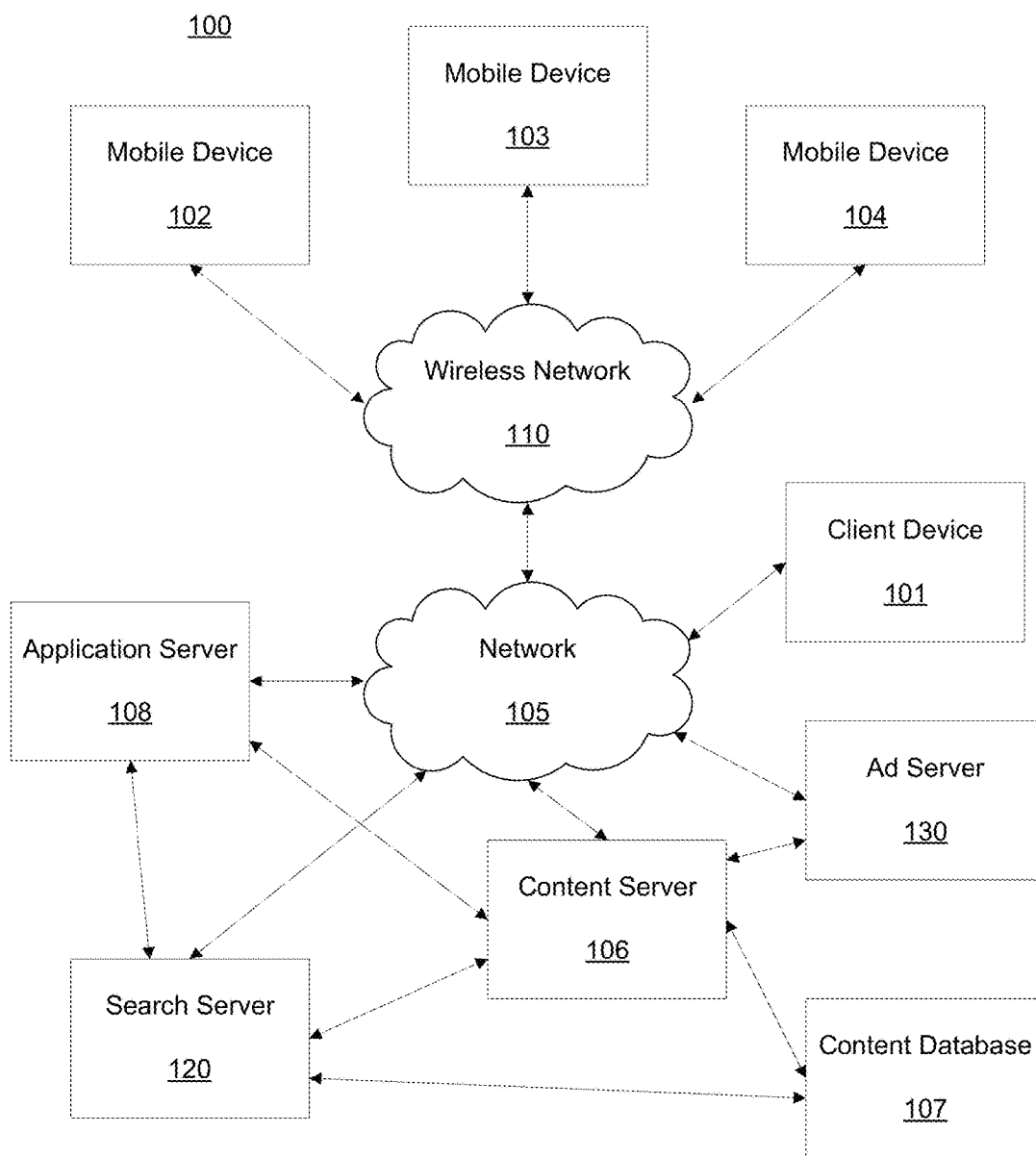
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. By way of background, an animated Graphics Interchange Format file (known as a GIF), is an image file format encoded with multiple image frames. Its intended use case is playing an animation of images continuously in an infinite loop. Up until the early 2000's, animated GIFs have been used primarily for playing simple clipart animations, such as, for example, flames and a waving American flag. However, when social networking sites such as Tumblr® and Reddit™ became popular in the late 2000's, people started using animated GIFs in a more creative way. Most notably, people started leveraging the large amount of online videos to create animated GIFs, generating numerous famous Internet memes and Cinemagraphs. As a result, the ubiquity of GIFs has increased dramatically extending across all social networking platforms and even having a place in fashion advertising.

With the widespread popularity of animated GIFs, there is currently a huge demand for easy-to-use tools that generate animated GIFs from videos. However, existing systems are cumbersome to use because they require users to manually specify two timestamps, the beginning and the end of a video clip, from which a single animated GIF is generated. Such conventional input can be performed either through a command line interface (CLI) or a graphical user interface (GUI). This requires a user to manually specify the exact time range which makes existing systems difficult to use and requires extensive human effort and experience.

For example, conventional systems require editors to manually extract individual animated GIFs from videos and share them on social media. Tumblr®, for example, has an estimated 1.5 billion content videos across its sites. The conventional approach to GIF creation becomes quickly impractical when dealing with such figures, and there currently exists no alternative solution as manual generation is the only option the editors have today.

As such, the instant disclosure provides a novel solution addressing the immediate demand for an automated system, application and/or platform that generates animated GIFs from videos. The present disclosure provides novel systems and methods for automatic extraction and creation of animated GIF files from video files. According to some embodiments, the disclosed systems and methods first identifies a segment(s) of a video file, interchangeably referred to as a "GIF candidate" or shot. A segment of a video file is a portion of the video file, not the entire video. Identification of the GIF segment(s) is based on a determination of shot boundaries within the video. Shot boundaries, which delineate the beginning and end of a segment of the video file, are associated with transition frames within the video file that provide an indication between differing scenes of the video's content. Such transition frames can include, but are not limited to, a cut between video frames, fade in/out between frames, dissolve or wipe effect(s), and/or any other type of known or to be known visual effect that indicates a transition between types content of a video file.

The disclosed systems and methods then evaluate each identified GIF candidate in terms of "GIF quality" metrics, which results in a score for each GIF candidate. "GIF quality" metrics are associated with a GIF candidate's attributes and/or features, which include, but are not limited to, visual aesthetics, popularity, virality, memorability, sentiment, temporal nature of the content of the GIF, motion occurring within the segment as it is played, induced emotion as the segment is played, interestingness of the content of the segment, and the like. For example, the higher the quality score (e.g., popularity score of a segment), the higher the probability the animated GIF candidate is trending, or will become trending, for example, on social media. While evaluating a GIF candidate, the disclosed systems and methods also determine an optimal playback speed for each GIF candidate—i.e., frame sampling rate and the time interval between each frame.

As discussed below in more detail, based on the determinations of the GIF candidates' "GIF quality" and optimal playback speed, the disclosed systems and methods can automatically create a GIF(s) from a video file that can be rendered at its optimal playback speed. In some embodiments, a selection may also occur whereby the GIF candidate having the highest "GIF quality" can be selected for presentation to a user. In some embodiments, only those GIF candidates having a "GIF quality" satisfying a threshold can be presented to a user, whereby these candidates can then be selected by a user for rendering and/or sharing.

The benefits of the disclosed systems and methods can be evidenced two-fold: 1) the disclosed systems and methods provide a technologically based mechanism for automatic extraction of animated GIFs from video files; and (2) the proposed systems and methods are based on and techniques that are specifically designed to evaluate the "GIF quality" of animated GIFs, for example, in terms of their induced popularity (i.e., how popular a GIF is or would become among the audience of social networks), which has never been explored before. Thus, the disclosed systems and methods, for example, extract GIFs from videos in a fully automated manner that is predicated on a determination of the "quality" of the GIF in a social networking setting.

The disclosed systems and methods can be implemented for any type of content item, including, but not limited to, video, audio, images, text, and/or any other type of multimedia content. While the discussion herein will focus on video content items, it should not be construed as limiting, as any type of content or multimedia content, whether known or to be known, can be utilized without departing from the scope of the instant disclosure.

As discussed in more detail below at least in relation to FIG. 6, according to some embodiments, information associated with or derived from created GIFs (or GIF candidates or shots), as discussed herein, can be used for monetization purposes and targeted advertising when providing, delivering, sharing or enabling access to the created GIFs. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")–network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., You-Tube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
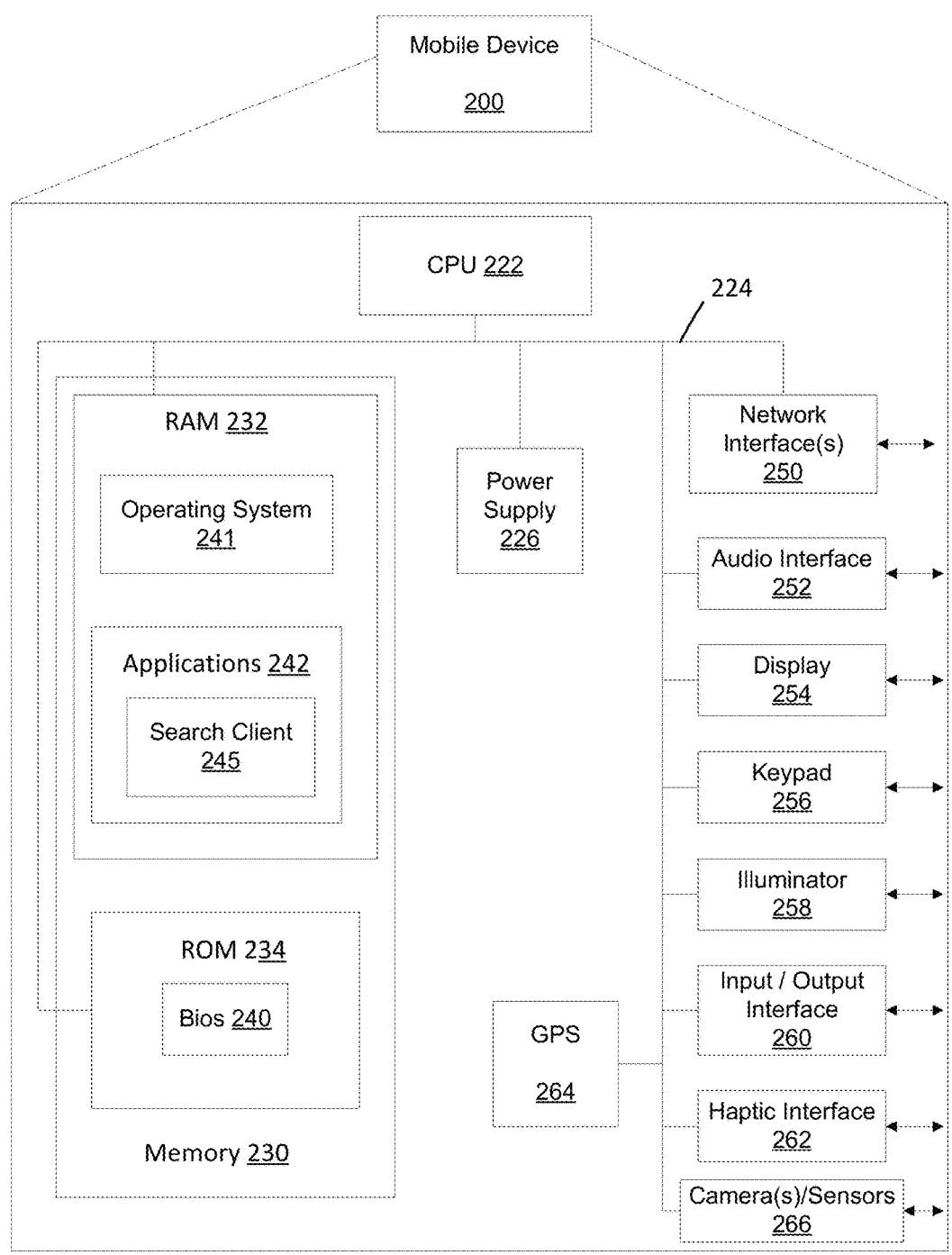
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
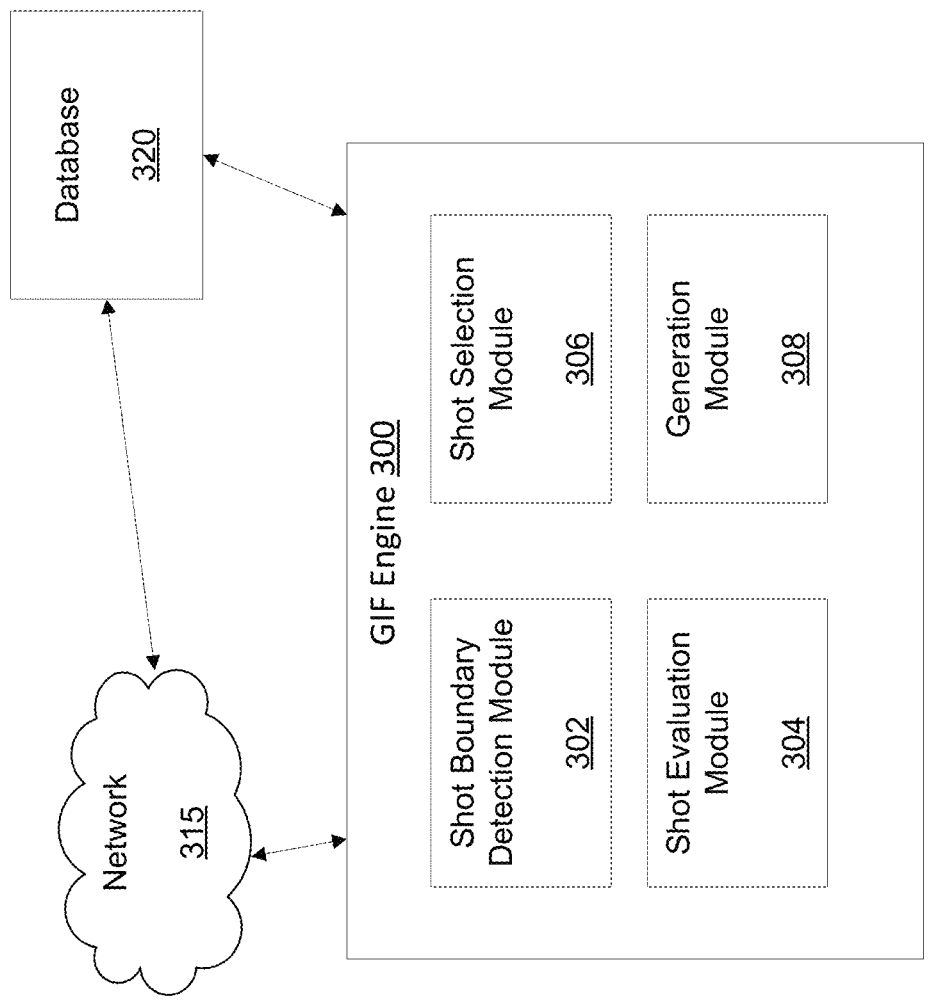
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a GIF engine 300, network 315 and database 320. The GIF engine 300 can be a special purpose machine or processor and could be hosted by an application server, content server, social networking server, web server, search server, content provider, email service provider, ad server, user's computing device, and the like, or any combination thereof.

According to some embodiments, GIF engine 300 can be embodied as a stand-alone application that executes on a user device. In some embodiments, the GIF engine 300 can function as an application installed on the user's device, and in some embodiments, such application can be a web-based application accessed by the user device over a network. In some embodiments, the GIF engine 300 can be installed as an augmenting script, program or application to another media application (e.g., Yahoo!® Video, YouTube®, Hulu®, and the like).

The database 320 can be any type of database or memory, and can be associated with a content server on a network (e.g., content server 106, search server 120 or application server 108 from FIG. 1) or a user's device (e.g., device 101-104 or device 200 from FIGS. 1-2). Database 320 comprises a dataset of data and metadata associated with local and/or network information related to users, services, applications, content (e.g., video) and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, recommending, rendering and/or delivering GIFs or videos, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with video content from an assortment of media providers. For example, the information can be related to, but not limited to, content type of the video, a category associated with the video, information associated with the pixels and frames of the videos, and any other type of known or to be known attribute or feature associated with a video file. Additionally, the video information in database 320 for each video can comprise, but is not limited to, attributes including, but not limited to, popularity of the video, quality of the video, recency of the video (when it was published, shared, edited and the like), and the like. Such factors can be derived from information provided by the user, a service provider (i.e., Yahoo!® or Tumblr®), by the content/service providers providing video content (e.g., Netflix®, Hulu®, YouTube®), or by other third party services (e.g., rottentomatoes.com, IMDB™, Facebook®, Twitter® and the like), or some combination thereof.

According to some embodiments, such video information can be represented as an n-dimensional vector (or feature vector) for each video, where the information associated with the video can be translated as a node on the n-dimensional vector. Database 320 can store and index video information in database 320 as linked set of video data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology.

While the discussion below will involve vector analysis of video information, as discussed above, the video information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, videos (which are stored and located in database 320) as a whole are discussed within some embodiments; however, it should not be construed to limit the applications of the systems and methods discussed herein. That is, while reference is made throughout the instant disclosure to videos (e.g., video clips, movies, music videos, TV shows, YouTube® videos, Instagram® videos, Vine™ videos, and/or any other type of streaming or downloadable video content), other forms of user generated content and associated information, including for example text, audio, multimedia, RSS feed information can be used without departing from the scope of the instant application, which can thereby be communicated and/or accessed and processed by the GIF engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the GIF engine 300, and the database of stored resources 320. Indeed, as illustrated in FIG. 3, the GIF engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as GIF engine 300, and includes shot boundary detection module 302, shot evaluation module 304, shot selection module 306, and generation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the GIF engine 300 can be supplied to the database 320 in order to ensure that the information housed in the database 320 is up-to-date as the disclosed systems and methods leverage real-time information and/or behavior associated with the video file, user and/or the user's device during or responsive to GIF creation, selection and rendering, as discussed in more detail below.

Figure 4:
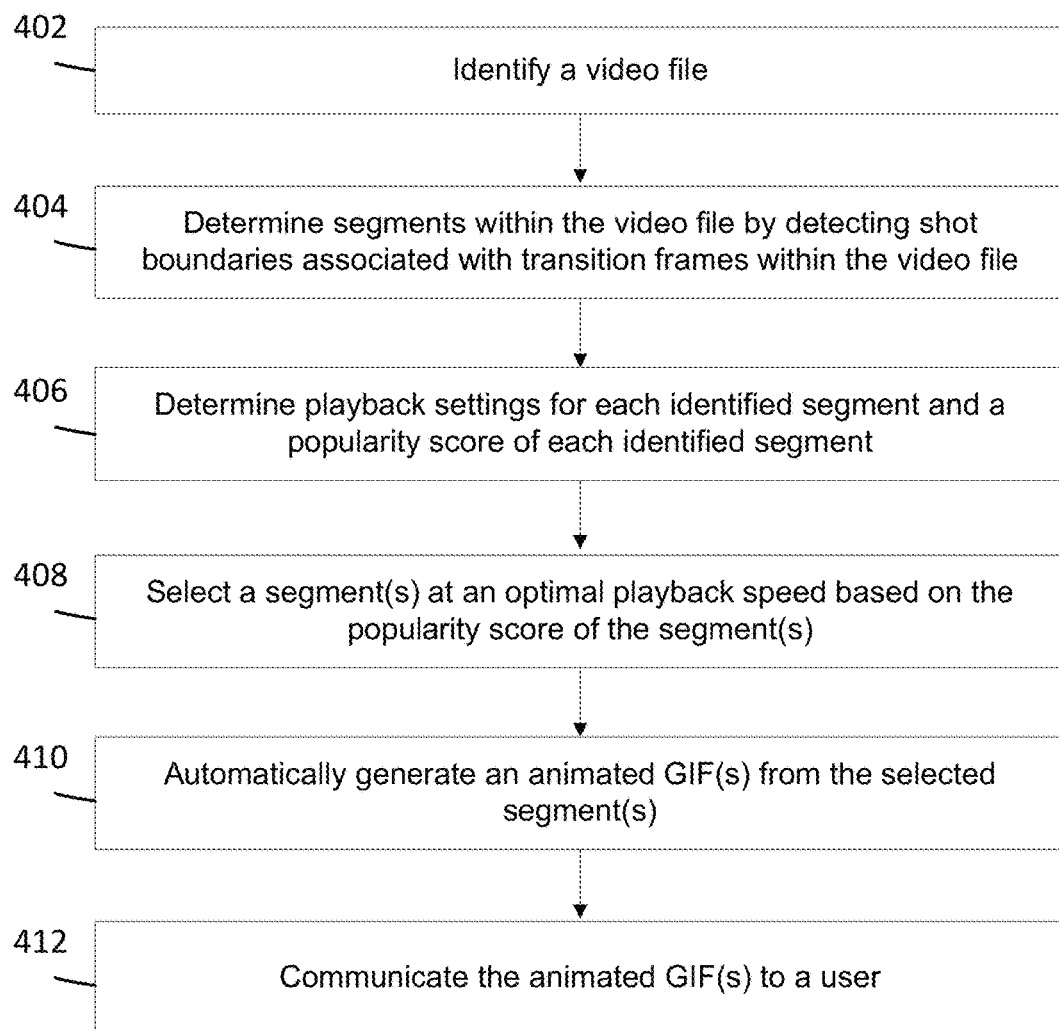
FIG. 4 is a flowchart illustrating steps performed in accordance with some embodiments of the present disclosure.

Turning to FIG. 4, Processes 400 details steps performed in accordance with exemplary embodiments of the present disclosure for automatically extracting and creating an animated Graphics Interchange Format (GIF) file from a video file. According to some embodiments, as discussed herein with relation to FIG. 4, Process 400 involves automatically extracting content from a video file in order to create a GIF file from the extracted content. Such extraction and creation involves, detecting boundaries between shots of a video; determining the optimal playback setting of animated GIFs; and analyzing motion, emotion, and interestingness of a shot, among other features and attributes, in order to determine the induced popularity of animated GIFs, as discussed in more detail below.

Process 400 beings with Step 402 where a video file is identified. Step 402's identification of a video file can be based on a user's request to view or preview the video file, the identification of the video file during a recommendation process, or a request from the user to generated a GIF from the video file, among other known or to be known processes that involve identification of a video file for presentation of at least a portion of the video file to the user.

Step 404 of Process 400, which is performed by the shot boundary detection module 302 of GIF engine 300, involves identifying at least one GIF candidate from within the video file by identifying shot boundaries in the video file. In other words, Step 404 identifies boundaries between shots in a video file, where a shot is a set of frames that are temporally adjacent in the video file and visually coherent. As discussed above, a GIF candidate (interchangeably referred to as a shot) is a segment of the video file that is delineated by a beginning shot boundary and an ending shot boundary. According to some embodiments, shot boundaries are transition frames within the video file, and include, but are not limited to, a cut between video frames, fade in/out between frames, dissolve or wipe effect(s), and/or any other type of known or to be known effect that transitions between scenes of a video file.

According to some embodiments, Step 404 involves analyzing the video file to determine each transition frame. Such analysis can include parsing the video file and analyzing each frame (or pixel of each frame) to identify discontinuities between adjacent frames. In some embodiments, the shot boundary detection occurring in Step 404 involves implementing any known or to be known media frame algorithm or scheme technique for determining differences between adjacent frames, such as, frame differencing and a multiple change point detection (MCPD) algorithm. As understood by those of skill in the art, such algorithms and techniques compute the sum of pixel-wise differences from each pair of frames over time, and then determine the boundaries by thresholding the difference value with an empirically found value.

In some embodiments, applications of the frame differencing technique focus on identifying transition frames that comprise "easy-to-detect" transitions, such as, cut, wipe and the like. In order to identify the more subtle boundaries, such as for example, fade in/out, or dissolve, the analysis of each frame is refined by applying the MCPD algorithm. Therefore, according to some embodiments, Step 404 involves the application of the frame differencing algorithm, then an application of the MCPD algorithm in order to refine the results from the frame differencing.

Thus, Step 404 involves analyzing the video file obtained from Step 402 via the shot boundary detection module 302 applying a frame differencing technique in order to identify the presence of transitions in the frames of the video file. The result of the frame differencing technique includes identification of the transition frames associated with cut, wipe, and similarly basic visual effects. This, therefore, provides an initial result of the segments (or shots) within the video file. Next, for each segment (or shot) that is longer than a predetermined length, the MCPD algorithm is applied. This application occurs because, as noted above, frame differencing cannot identify the more subtle transition effects of a video due to its efficient techniques of analyzing media; therefore, the shot boundary detection module 302 implements a more complex algorithm (i.e., MCPD) to identify transitions (e.g., dissolve and wipe) within the segments/shots that are longer than a predetermined length (e.g., 10 seconds), as such subtle transitions may have went undetected during the initial frame differencing analysis. In some embodiments, if there are no shots longer than the predetermined length, the analysis stops as all transition frames are understood to be located.

Therefore, according to some embodiments, the shot boundary detection module 302 applies a "divide-and-conquer" approach to its analysis of the video file by "dividing" (or parsing) the video file in to segments using an efficient algorithm (e.g., frame differencing), then "conquering" each small piece using a comprehensive algorithm (e.g., MCPD algorithm). As a result of Step 404, shot boundaries within a video file are detected, which are represented as time indices within the video file, and as a result, reference to each shot (or segment or GIF candidate) can be made from sequential shot boundary pairs.

In some embodiments, Step 404 may involve applying the frame differencing and MCPD algorithms at the same time; or, may involve only applying the MCPD algorithm. In some embodiments, Step 404 may involve applying any known or to be known algorithm that can identify all types of known or to be known transitions within a media file thereby avoiding the two-step process of Step 404 discussed above.

Figure 5:
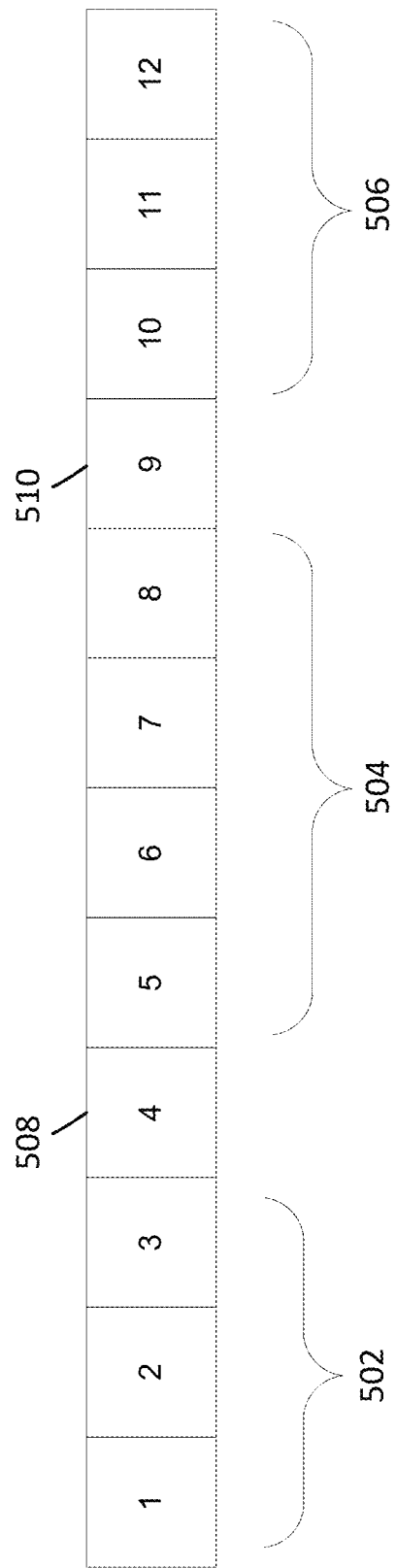
FIG. 5 is a diagram of an exemplary example of a non-limiting embodiment in accordance with some embodiments of the present disclosure.

By way of a non-limiting example, FIG. 5 illustrates the discussion above respective to Steps 402-404. FIG. 5 illustrates a video file 500 that is obtained (Step 402), whereby, for example, the video 500 has image frames 1-12. The video, for example, includes content showing a reporter speaking in front of a court house (frames 1-3), then the content transitions (frame 4) to a clip of a couple getting married (frames 5-8), then finally transitions (frame 9) back to the reporter (frames 10-12). The shot boundary detection of Step 404 involves analyzing the frames of the video to not only identify when the transitions occur (frames 4 and 9), but also to identify each segment of the video bookended by the transitions. The two transitions that are identified correspond to the video cutting from the reporter (frame 4, item 508 which represents the image frame where the transition effect occurs), then cutting back to the reporter (frame 9, item 510 which represents the image frame where the transition effect occurs). Thus, there are three shots (or segments) in the video delineated by the two identified transitions: 1) the first shot of the reporter (frames 1-3, item 502); 2) the clip of the wedding (frames 5-8, item 504); and 3) the second shot of the reporter (frames 10-12, item 506). In some embodiments, the true beginning and end of the video file can be viewed as transitions that indicate the beginning and end of the video file; therefore, there can actually be 4 transitions, where the beginning of the video file an the first transition bookend the first shot of the reporter and the second transition and the end of the video file bookend the second shot of the reporter. In some embodiments, the transitions frames may also be included in an identified shot, either the beginning transition frame, ending transition frame, or some combination thereof. Thus, as discussed in more detail below, in the example of FIG. 5, there are 3 shots (items 502-506), and each shot is then analyzed according to the discussion below respective to Steps 406-412, whereby at least one shot (items 502-506) can be converted to an animated GIF.

Continuing with Process 400, Step 406 involves analyzing each GIF candidate identified from Step 404 and determining its popularity. Step 406 is performed by the shot evaluation module 304. Step 406's popularity determination is associated with a determination of a GIF candidate's optimal playback settings. As discussed herein, the optimal playback settings are based on the shot's "quality" which corresponds to the shot's features, which include motion, emotion, and interestingness, as discussed herein.

Step 406's GIF candidate (or shot) evaluation involves four parts: 1) generating multiple playback settings, 2) feature extraction, 3) feature fusion, and 4) popularity score estimation. Turning to Part 1 of Step 406: a shot can be transformed into an animated GIF using different playback settings; therefore, by adjusting the frame sampling rate and the time interval between two frames the shot can be played faster or slower, at different frame rates. Since an animated GIF can look very different based on its playback setting, its popularity may change even if it was generated from the same shot (e.g., playing too fast or slow would render the GIF unwatchable or uninteresting); therefore, each GIF candidate identified from Step 404 can have multiple different versions created in Part 1 of Step 406, where each version has a different playback settings.

Part 1 of Step 406 involves adjusting the frame sampling rate of a shot by specifying the step size between frames within the shot. For example, a given shot has 30 frames $x_1$, $x_2, x_3, \ldots, x_{30}$. Using a step size of one, the animated GIF will retain all the original 30 frames; using a step size two, every other frame is skipped and the animated GIF will contain half the number of the original frames—i.e., $x_1, x_3, x_5, \ldots x_{29}$.

Part 1 of Step 406 also involves adjusting the time interval between two adjacent frames. As understood by those of skill in the art, every video file is encoded with this information, which is referred to by those of skill in the art as frames per second (FPS). In some embodiments, the time interval is varied by multiplying a positive real number to the FPS of the shot. Such positive real number can be set according to a factor(s) to ensure a varying playback speed. For example, the step size between $\{1, 2, 3, \ldots, 10\}$ may be varied by changing the time interval by multiplying it by $\{\frac{1}{5}, \frac{1}{4}, \frac{1}{3}, \frac{1}{2}, 1, 2, 3, 4, 5\}$. As a result, 90 different playback settings from a given shot can be generated.

As a result of Part 1 of Step 406, multiple playback settings for a given shot identified from Step 404 are determined. The number of playback settings can be in accordance with a predetermined number setting set by a user, the system, and application, an administrator, and the like, or some combination thereof. That is, based on the adjustments to the frame sampling rate and the time intervals, multiple playback rates for a shot are determined. The determination of multiple playback rates (or settings) is utilized to select a given shot and generate an animated GIF, as discussed below.

Given an identified shot (or GIF candidate) from Step 404, and its determined playback settings (from Part 1 of Step 406), Step 406 then involves performing feature extraction (Part 2 of Step 406) in order to extract three types of features from the shot: 1) motion, 2) emotion, and 3) interestingness.

Motion plays an important role in animated GIFs, as without motion, an animated GIF would merely be a static image. Motion can be described in a variety of different ways, and for purposes of this disclosure, motion is characterized by attributes corresponding to a) shape and appearance changes over time, b) the total aggregate motion energy, and c) the loop likelihood.

To measure the first attribute of motion: a) the shape and the appearance changes over time, the shot evaluation module 304 parses a shot and identifies each frame (or image frame). The shot evaluation module 304 then samples points (or positions, or pixels) within each frame and estimates an optical flow over time in order to obtain its trajectory. Such sampling is performed by utilizing any known or to be known efficient solution based on density trajectories or any other known or to be known technique based on optical flow in order to determine a pattern of apparent motion of objects, surfaces, and edges in a frame. For example, such techniques can include, but are not limited to, phase correlation, discrete optimization algorithms and differential optical flow estimates, such as, but not limited to, a Lucas-Kanade method, a Horn-Schunck method, a Buxton-Buxton method, a Black-Jepson method, and the like, or any other known or to be known methodology. The shot evaluation module 304 then computes, from each trajectory, three types of feature descriptors to describe the shape and appearance of motion over time: 1) histograms of oriented gradients, 2) histograms of optical flows, and 3) histograms of motion boundaries.

To measure the second attribute of motion: b) the total aggregate motion energy, there are many known (and to be known) techniques. In some embodiments, the shot evaluation module 304 can determine a pixel-wise difference value between frames over the entire duration of a shot and then aggregate such difference value. In some embodiments, the shot evaluation module 304 can compute dense trajectories (as discussed above) and aggregate the total displacement of such trajectories. As such, the higher the measure of total displacement, the more dynamic the motion of the shot.

To measure the third attribute of motion: c) the loop likelihood, there are also many known (and to be known) techniques. In a similar manner as determining the measure of b) the total energy, the shot evaluation module 304 can determine an aggregate of a pixel-wise difference value between frames of the shot, or determine an aggregate of the total displacement of the dense trajectories. However, the difference for c) the loop likelihood is that instead of considering the entirety of frames of the shot, the shot evaluation module 304 focuses specifically on the shot boundaries (i.e., the beginning and end of a shot, as it is the beginning and end parts of the shot that characterize the looping behavior). Therefore, in some embodiments, the shot evaluation module 304 can measure the sum of pixel-wise difference values between the first and the last frame of a shot, or a window (e.g., predetermined range) of frames at the beginning and end of the shot. In some embodiments, the shot evaluation module 304 can compute the optical flow between the first and the last frame (or their associated windows), and measure the total optical flow displacements.

Turning to the emotion feature of a shot, in some embodiments, the shot evaluation module 304 bases the emotion determination on six universally recognized basic emotions: anger, disgust, fear, happiness, sadness, and surprise. In some embodiments, from a given shot, the shot evaluation module 304 determines the intensities of the six emotions and compiles a six-dimensional real vector, with the values normalized between 0 (low intensity) and 1 (high intensity). In some embodiments, the emotion determination may include more or less emotions.

It should be understood that any type of known or to be known facial recognition and/or action recognition algorithm or technique can be utilized to analyze a shot and determine emotional intensities from the shot—such as, but not limited to, geometric algorithms, photometric algorithms, three-dimensional (3D) algorithms and/or skin-texture algorithms. For example, such algorithms can include, but are not limited to, principal component analysis using Eigen-faces, linear discriminate analysis, elastic bunch graph matching using the Fisherface algorithm, a Hidden Markov model, the Multilinear Subspace Learning using tensor representation, a neuronal motivated dynamic link matching, and the like.

For example, according to some embodiments, the intensities of emotions can be determined by detecting facial action units in a frame of a shot—facial action units are a standard set of human facial muscle movements used to systematically categorize the physical expression of emotions. For example, it is well known that happiness can be described as a combination of AU 6 (cheek raiser)+AU 12 (lip corner puller); therefore, by the shot evaluation module 304 applying any known or to be known facial recognition technique or algorithm to the frame(s) of a shot, the happiness emotion can be recognized by detecting the presence of AU6 and AU12.

The third type of features extracted in Part 2 of Step 406 is the interestingness feature. The shot evaluation module 304 measures the interestingness of a shot by the presence or absence of a set of predefined objects and actions. For example, the set may include certain object categories such as the human face, cat, and dog; and also action categories such as dunk shot (basketball), touchdown (football), hole in one (golf), to name a few examples. Given a set of N object categories and M action categories, the shot evaluation module 304 analyzes the frames of a shot and detects each of them using any known or to be known object and action detection algorithm, such as, but not limited to feature learning, vectorization, Gaussian recognition, Hidden Markov Models (HMM), and the like. As a result of such analysis, the object and action categories are translated into an (N+M)-dimensional real vector which represents the interestingness of a shot, where each node on the vector indicates the confidence level of the presence of an object or an action in the shot, normalized between a 0 (low confidence) and 1 (high confidence) value.

Turning to Part 3 of Step 406, the shot evaluation module 304 combines the three types of features (i.e., motion, emotion and interestingness, discussed above) by concatenating them into a single feature vector. It should be understood by those of skill in the art that any type of known or to be known principal component analysis and canonical correlation analysis or vector analysis can be applied herein without departing from the scope of the instant disclosure. For example, the three features can be translated into a single feature vector via a vector analysis algorithm or technique, as well as any known or to be known computational analysis technique or algorithm, such as, but not limited to, cluster analysis, data mining, Bayesian network analysis, Hidden Markov models, artificial neural network analysis, logical model and/or tree analysis, and the like. The output of Part 3 of Step 406 is a single feature vector (referred to as the fusion feature vector) that has a dimension that is fixed across shots with different lengths and playback settings.

Part 4 of Step 406 involves determining (or determining a probability or estimating) an induced popularity score of a shot under a specific playback setting by using any known or to be known regression function that maps the feature vector from Part 3 of Step 406 (i.e., the fusion feature vector resultant of the fusion of the extracted features motion, emotion and interestingness) to a popularity score. Indeed, any known or to be known regression function can be utilized herein without departing from the scope of the instant disclosure, such as, for example, linear regression, support vector regression and the like.

Therefore, according to some embodiments, the shot evaluation module 304 applies a regression function to the fusion feature vector X and a weighted (optimal) parameter W and returns a real valued output score y: F(X,W)=y. The weighted parameter W is based on a trained popularity model, as discussed below.

As understood by not only those of skill in the art, but also by everyday users of the internet, users express their interests to animated GIFs posted on social networking sites (e.g., Tumblr®) through a number of actions, such as, "like" or "reblog" (or sharing or reposts). The more likes or shares an animated GIF (or any content item has for that matter), the more popular it is. The trained popularity model utilizes this information as a proxy measure for popularity from which parameter W is derived.

The GIF engine 300 leverages existing data resources from social networking sites (e.g., Tumblr®) by analyzing a large number of animated GIFs and their corresponding number of likes and shares (e.g., reblogs). For each GIF, motion, emotion and interestingness features are extracted and translated into their own fusion feature vector X—which is performed in a similar manner as discussed above.

For example, a training dataset of GIFs from Tumblr® is denoted as D: D={$(X_i, y_i)$} where $y_i$ is the aggregate number of likes and reblogs for the $i^{th}$ animated GIF in the dataset. The weighted parameter W is determined by solving:

$$W=\mathrm{argmin}\_\{W\}\mathrm{\sum}\_\{i\}\mathrm{loss}(y\_i,F(X\_i,W))+R(W),$$

where loss($y_i$, F($X_i$, W)) measures the discrepancy between the estimated and the actual popularity score. The second term, R(W), referred to as the regularizer, prevents overfitting the solution to a given dataset by measuring the complexity of the solution W (where the more complex the solution is, the more probable the function will overfit). For example, typical choices of the regularizer include L2 and L1 norms. In some embodiments as discussed above, any proper loss function for regression analysis (or support vector regression) can be used here, for example, e.g., squared loss: $\frac{1}{2}(y_i-F(X_i, W))^2$. By minimizing the expected loss over the training dataset, the optimal solution W is determined, which best estimates the popularity of animated GIFs among an audience (e.g., users from the social networking site where the data set was collected—e.g., Tumblr®).

Therefore, Part 4 of Step 406 as discussed above involves the shot evaluation module 304 applying a regression function to the fusion feature vector X and a weighted (optimal) parameter W, and returning a real valued output score y: F(X,W)=y. Referring back to Part 1 of Step 406, where the multiple playback settings are analyzed for a given shot, Part 4 of Step 406 involves identifying the popularity score for each playback setting in order to determine the optimal playback setting of a shot.

In summary of Parts 1-4 of Step 406, the shot evaluation module 304 analyzes the shots identified from Step 404 in order to determine multiple playback settings for each shot (Part 1). Then, each shot is analyzed in order to extract features related to motion, emotion and interestingness (Part 2). The extracted features are compiled into a fusion feature vector (Part 3). Then, a regression algorithm is applied to the fusion feature vector in order to determine a popularity score for each of the multiple playback settings (Part 4). Thus Step 406 results in an evaluation of the shots (or GIF candidates) of a video file that provides an indication of the popularity scores for each shot, at differing playback speeds.

In step 408, the shot selection module 306 selects a predetermined number of top scoring shots for animated GIF generation. The selected shot(s) is formatted according to an optimal playback setting (selected from the multiple playback settings of the shot), which is determined by such shot(s) version having the highest popularity score(s). In some embodiments, the number of shots selected can be set by a user, the system, device or network capabilities for rendering a GIF, an application, an administrator, and the like, or some combination thereof. In some embodiments, the number of top scoring shots must satisfy a popularity threshold, in that only shots with popularity scores at or above the popularity threshold are eligible for selection. In some embodiments, if the GIF engine 300 is requested to generate a specific number of GIFs from a video file (e.g., by a request from a user), then only the top scoring shots corresponding to that specific number are selected (e.g., if a single GIF is requested, then the shot with the highest score is selected). In some embodiments, the selection of shot can be performed by a user, where multiple shots are presented to a user, and the user can select the shot(s) he or she desires to convert into an animated GIF.

In some embodiments, when multiple GIFs are requested, in order to ensure that the resulting animated GIFs are non-redundant, the shot selection module 306 can perform any known or to be known clustering analysis, where the number of clusters set is the number of animated GIFs to be generated (or requested), and the only one animated GIF per cluster can be selected.

In Step 410, the generation module 308 transforms the selected shot(s) (or selected GIF candidate) into an animated GIF. That is, the animated GIF is created from the selected shot(s). Thus, the shot with the optimal playback speed (based on the associated popularity score) is converted into an animated GIF. The generation module 308 can create the animated GIF using any known or to be known shot/segment transformation technique, such as, but not limited to, imagemagick and gifsicle libraries, to name a few examples.

In Step 412, the generated animated GIF(s) is communicated to a user for display on the user's device. In some embodiments, such communication can involve automatically rendering the GIF upon display on the user's device, and in some embodiments, such communication can involve a user sharing the GIF with another user. In some embodiments, sharing of the GIF with an identified set of users can be performed automatically upon generation of the GIF, where not only does the requesting user receive the GIF, but also other users who follow the user, or have been identified by the user, can be provided the generated GIF (e.g., reblogging the GIF to a user's followers pages on Tumblr®). As will be understood by those of skill in the art, sharing GIFs extracted from videos in this manner could result in improved user engagement in video content from which the GIF was created and/or the generated GIFs, as well as increased activity by users on a social networking site that hosts and/or creates such GIFs.

According to some embodiments of the present disclosure, information associated with a extracted/created GIF, as discussed above in relation to Process 400, can be fed back to the GIF engine 300 for modeling (or training) of the information stored in database 320 via iterative or recursive bootstrapping or aggregation functionality. This can improve the accuracy of popularity scores for GIF candidates (i.e. shots) and/or the selection of the optimal playback speeds for particular types of GIF files, as discussed above. Embodiments of the present disclosure involve the recommendation engine 300 applying such recursive/bootstrapping functions utilizing any known or to be known open source and/or commercial software machine learning algorithm, technique or technology.

FIG. 6 is a work flow example 600 for serving relevant digital content associated with advertisements (e.g., advertisement content) based on the information associated with a created GIF, as discussed above in relation to FIGS. 3-4. Such information, referred to as "GIF information" for reference purposes only, can include, but is not limited to, the identity of the video from which the GIF was created, the attributes of the video from which the GIF was created, attributes of the GIF, the content of the GIF, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 600 includes a user being provided with a GIF that displays looping video content of a touchdown from the Super Bowl®. Based on information related to the determination that the GIF relates to the sport of football, specifically the NFL®, for example, the user may be provided with digital ad content related to the purchase of NFL merchandise.

In Step 602, GIF information associated with a created GIF file is identified. As discussed above, the GIF information can be based on the GIF creation process outlined above with respect to FIGS. 3-4. For purposes of this disclosure, Process 600 will refer to single GIF file as the basis for serving an advertisement(s); however, it should not be construed as limiting, as any number of GIFs, and/or quantities of information related to users and their interaction with created GIFs can form such basis, without departing from the scope of the instant disclosure.

In Step 604, a context is determined based on the identified GIF information. This context forms a basis for serving advertisements related to the GIF information. In some embodiments, the context can be determined by determining a category which the GIF information of Step 602 represents. For example, the category can be related to the type of video from which the GIF was created, and/or can be related to the content type of the GIF file. In some embodiments, the identification of the context from Step 604 can occur before, during and/or after the analysis detailed above with respect to Process 400, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the GIF. Step 612. In some embodiments, the selected advertisement is sent directly to each user's computing device. In some embodiments, the selected advertisement is displayed in conjunction with a displayed GIF on the user's device and/or within the application being used to identify, select and/or render the GIF file.

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:
receiving, at a computing device, a request from a user for creation of an animated Graphics Interchange Format (GIF) file from a video file;
determining, via the computing device, a segment within the video file, said segment determination comprising parsing the video file to identify transition frames within the video file, said segment comprising video frames of the video file existing between a pair of identified transition frames;
determining, via the computing device, playback settings for the segment, each playback setting comprising a different frame sampling rate and time interval between each frame of the segment;
determining, via the computing device, an n-dimensional feature vector for the segment, said feature vector determination comprising parsing the segment to identify information associated with motion, emotion and interestingness features of the segment, said feature vector based on the motion, emotion and interestingness information;

determining, via the computing device, a popularity score for each playback setting based on the feature vector, said popularity score determination comprising determining an optimal playback setting for the segment from the playback settings; and automatically creating, via the computing device, the animated GIF file, said animated GIF file comprising said segment renderable at said optimal playback setting.

2. The method of claim 1, further comprising:
communicating, via the computing device, said animated GIF file to said user for display on a device of the user.

3. The method of claim 1, wherein said segment determination further comprising:
determining that said segment comprises a time length at or above a time threshold; and
re-parsing said segment via a multiple change point detection (MCPD) algorithm to identify additional transitional frames within the segment, wherein said segment is in accordance with said additional transitional frames.

4. The method of claim 1, wherein said parsing of the segment to identify said transition frames comprises applying a frame differencing algorithm.

5. The method of claim 1, wherein said transition frames comprise a visual effect selected from a group consisting of: a cut between video frames, fade in/out between frames, dissolve and wipe.

6. The method of claim 1, wherein said playback settings determination further comprising:
determining a frame per second (FPS) value for the segment; and
determining a time interval between frames of the segment for each playback setting by multiplying a positive real number factor to the FPS value.

7. The method of claim 1, further comprising:
determining said motion information by analyzing attributes of the segment, said attributes comprising shape and appearance changes over time, total aggregate motion energy, and loop likelihood;
determining said emotion information by analyzing intensities of recognized emotions within said segments, said recognized emotions are determined by detecting facial action units within frames of the segment; and
determining said interestingness information by detecting the presence or absence of a set of predefined objects and actions in the frames of the segment.

8. The method of claim 7, wherein said feature vector determination further comprising:
combining the motion, emotion and interestingness information into said n-dimensional feature vector, said n-dimensional value being a consistent value across each playback setting.

9. The method of claim 1, wherein said popularity score determination further comprising:
applying a regression function to the feature vector in order to determine the optimal playback setting of the segment, said application of the regression function is based on a trained dataset of known GIFs, wherein said known GIFs have associated therewith popularity scores based on interactions by users over a network, wherein said popularity scores of the known GIFs are further based on motion, emotion and interestingness information derived from each known GIF.

10. The method of claim 9, wherein said optimal playback setting corresponds to a version of the segment with a playback setting having a determined highest popularity score, said determined highest popularity score based on said application of the regression function.

11. The method of claim 1, wherein the steps of the method are performed for multiple segments within the video file, wherein said method further comprises:
automatically selecting a predetermined number segments for GIF creation.

12. The method of claim 11, wherein said selected segments satisfy a popularity score threshold.

13. The method of claim 11, wherein said selected segments correspond to a number of segments being requested.

14. The method of claim 1, further comprising:
determining a context of the animated GIF file;
causing communication, over the network, of said context to an advertisement platform to obtain digital advertisement content associated with said context; and
communicating said identified digital advertisement content with said animated GIF file to the user.

15. A non-transitory computer-readable storage medium tangibly encoded with computer-executable instructions, that when executed by a processor associated with a computing device, performs a method comprising:
receiving a request from a user for creation of an animated Graphics Interchange Format (GIF) file from a video file;
determining a segment within the video file, said segment determination comprising parsing the video file to identify transition frames within the video file, said segment comprising video frames of the video file existing between a pair of identified transition frames;
determining playback settings for the segment, each playback setting comprising a different frame sampling rate and time interval between each frame of the segment;
determining an n-dimensional feature vector for the segment, said feature vector determination comprising parsing the segment to identify information associated with motion, emotion and interestingness features of the segment, said feature vector based on the motion, emotion and interestingness information;
determining a popularity score for each playback setting based on the feature vector, said popularity score determination comprising determining an optimal playback setting for the segment from the playback settings; and
automatically creating the animated GIF file, said animated GIF file comprising said segment renderable at said optimal playback setting.

16. The non-transitory computer-readable storage medium of claim 15, wherein said segment determination further comprising:
determining that said segment comprises a time length at or above a time threshold; and
re-parsing said segment via a multiple change point detection (MCPD) algorithm to identify additional transitional frames within the segment, wherein said segment is in accordance with said additional transitional frames.

17. The non-transitory computer-readable storage medium of claim 15, wherein said playback settings determination further comprising:
determining a frame per second (FPS) value for the segment; and determining a time interval between frames of the segment for each playback setting by multiplying a positive real number factor to the FPS value.

18. The non-transitory computer-readable storage medium of claim 15, further comprising:
   determining said motion information by analyzing attributes of the segment, said attributes comprising shape and appearance changes over time, total aggregate motion energy, and loop likelihood;
   determining said emotion information by analyzing intensities of recognized emotions within said segments, said recognized emotions are determined by detecting facial action units within frames of the segment;
   determining said interestingness information by detecting the presence or absence of a set of predefined objects and actions in the frames of the segment; and
   combining the motion, emotion and interestingness information into said n-dimensional feature vector, said n-dimensional value being a consistent value across each playback setting.

19. The non-transitory computer-readable storage medium of claim 15, wherein said popularity score determination further comprising:
   applying a regression function to the feature vector in order to determine the optimal playback setting of the segment, said application of the regression function is based on a trained dataset of known GIFs, wherein said known GIFs have associated therewith popularity scores based on interactions by users over a network, wherein said popularity scores of the known GIFs are further based on motion, emotion and interestingness information derived from each known GIF,
      wherein said optimal playback setting corresponds to a version of the segment with a playback setting having a determined highest popularity score, said determined highest popularity score based on said application of the regression function.

20. A computing device comprising:
   a processor;
   a non-transitory computer-readable storage medium for tangibly storing thereon program logic for execution by the processor, the program logic comprising:
      receiving logic executed by the processor for receiving a request from a user for creation of an animated Graphics Interchange Format (GIF) file from a video file;
      determining logic executed by the processor for determining a segment within the video file, said segment determination comprising parsing the video file to identify transition frames within the video file, said segment comprising video frames of the video file existing between a pair of identified transition frames;
      determining logic executed by the processor for determining playback settings for the segment, each playback setting comprising a different frame sampling rate and time interval between each frame of the segment;
      determining logic executed by the processor for determining an n-dimensional feature vector for the segment, said feature vector determination comprising parsing the segment to identify information associated with motion, emotion and interestingness features of the segment, said feature vector based on the motion, emotion and interestingness information;
      determining logic executed by the processor for determining a popularity score for each playback setting based on the feature vector, said popularity score determination comprising determining an optimal playback setting for the segment from the playback settings; and
      creating logic executed by the processor for automatically creating the animated GIF file, said animated GIF file comprising said segment renderable at said optimal playback setting.

* * * * *